United States Patent
Tamai et al.

(10) Patent No.: US 8,727,523 B2
(45) Date of Patent: *May 20, 2014

(54) INKJET RECORDING INK, INK CARTRIDGE AND INKJET RECORDING METHOD

(75) Inventors: Takashi Tamai, Kanagawa (JP);
Michihiko Namba, Kanagawa (JP);
Akihiko Matsuyama, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/419,642

(22) Filed: Mar. 14, 2012

(65) Prior Publication Data

US 2012/0236066 A1    Sep. 20, 2012

(30) Foreign Application Priority Data

Mar. 15, 2011 (JP) .................................. 2011-056937

(51) Int. Cl.
*B41J 2/01* (2006.01)

(52) U.S. Cl.
USPC ............................................. 347/100; 347/95

(58) Field of Classification Search
CPC .................. B41J 2/2107; B41J 2/01
USPC ............... 347/21, 95–100, 28; 523/160, 161; 106/31.13, 31.6
See application file for complete search history.

(56) References Cited

U.S. PATENT DOCUMENTS

| 7,094,813 B2 | 8/2006 | Namba et al. |
| 7,284,851 B2 | 10/2007 | Bannai et al. |

(Continued)

FOREIGN PATENT DOCUMENTS

| JP | 2006-316243 | 11/2006 |
| JP | 2007-84807 | 4/2007 |
| WO | WO 2007100121 A1 * | 9/2007 |

*Primary Examiner* — Matthew Luu
*Assistant Examiner* — Rut Patel
(74) *Attorney, Agent, or Firm* — Oblon, Spivak, McClelland, Maier & Neustadt, L.L.P.

(57) ABSTRACT

An inkjet recording ink including: a colorant; surfactant A; surfactant B; a water-soluble organic solvent; and water, wherein the surfactant A is represented by General Formula (1), and the surfactant B is at least one selected from compounds represented by General Formulas (2a) and (2b):

General Formula (1)

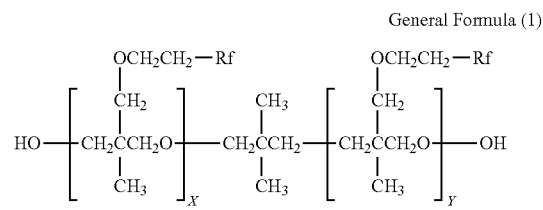

where Rf represents $CF_3$, $CF_2CF_3$, $(CF_2)_3F$ or $(CF_2)_4F$, X and Y each are an integer of 1 or greater, and X+Y=4 or 5;

General Formula (2a)

$$R^3-CH-O-[CH_2-CH_2O]_r-[CH_2CHO]_s-H$$
$$\hspace{1em}|\hspace{12em}|$$
$$\hspace{0.5em}R^4\hspace{11em}CH_3$$

where $R^3$ and $R^4$ each represent a hydrogen atom or a C1-20 alkyl group, r is a real number of 0 to 7, and s is a real number of 1 to 10, General Formula (2b)

$$R^3-CH-O-[CH_2-CHO]_t-[CH_2CHO]_u-H$$
$$\hspace{1em}|\hspace{8em}|\hspace{5em}|$$
$$\hspace{0.5em}R^4\hspace{7em}CH_3\hspace{4em}CH_3$$

where each of $R^3$ and $R^4$ represents a hydrogen atom or a C1-20 alkyl group, t is a real number of 0 to 7, and u is a real number of 1 to 10.

18 Claims, 3 Drawing Sheets

(56) References Cited

U.S. PATENT DOCUMENTS

| | | |
|---|---|---|
| 7,682,011 B2 | 3/2010 | Namba et al. |
| 7,699,457 B2 | 4/2010 | Namba et al. |
| 7,810,919 B2 | 10/2010 | Kojima et al. |
| 7,892,340 B2 | 2/2011 | Namba et al. |
| 7,919,544 B2 | 4/2011 | Matsuyama et al. |
| 7,977,408 B2 | 7/2011 | Matsuyama et al. |
| 8,044,114 B2 | 10/2011 | Habashi et al. |
| 8,096,651 B2 | 1/2012 | Ohshima et al. |
| 8,109,622 B2 | 2/2012 | Goto |
| 2007/0197685 A1 | 8/2007 | Aruga et al. |
| 2008/0092773 A1 | 4/2008 | Matsuyama |
| 2008/0248260 A1* | 10/2008 | Kojima et al. ............ 428/195.1 |
| 2009/0047431 A1 | 2/2009 | Hatada et al. |
| 2009/0162569 A1 | 6/2009 | Morohoshi et al. |
| 2009/0176070 A1 | 7/2009 | Goto et al. |
| 2009/0186162 A1 | 7/2009 | Namba et al. |
| 2009/0258196 A1 | 10/2009 | Nagashima et al. |
| 2009/0263632 A1 | 10/2009 | Kojima et al. |
| 2010/0271435 A1 | 10/2010 | Kojima et al. |
| 2010/0279035 A1 | 11/2010 | Namba et al. |
| 2010/0285287 A1 | 11/2010 | Matsuyama et al. |
| 2010/0302326 A1 | 12/2010 | Morohoshi et al. |
| 2011/0057981 A1 | 3/2011 | Aruga et al. |
| 2011/0092610 A1 | 4/2011 | Habashi et al. |
| 2011/0205288 A1 | 8/2011 | Matsuyama et al. |
| 2011/0216123 A1* | 9/2011 | Tamai et al. ............ 347/20 |
| 2011/0310166 A1 | 12/2011 | Namba et al. |

\* cited by examiner

INKJET RECORDING INK, INK CARTRIDGE AND INKJET RECORDING METHOD

BACKGROUND OF THE INVENTION

1. Field of the Invention

This invention relates to an inkjet recording ink, an inkjet recording method and an ink-recorded matter.

2. Description of the Related Art

Pigment-based inkjet recording ink that employs an ordinary hydrocarbon-based surfactant can hardly get to the level of dye-based ink in terms of uniformity of solid areas of images and coloring property of ink. That the use of a fluorine-based material as surfactant can reduce the surface tension of ink and improve the uniformity of solid areas of images and the coloring property of ink is already known.

However, known fluorine-based surfactants give rise to an excessive bubbling property and make ink easily bubble. Therefore, they can adversely affect the filling property and the ejection stability of ink. On the other hand, known silicon-based surfactants can be decomposed by heat in an accelerated manner and hence entails a problem of poor preservability. Additionally, fluorine-based surfactants make ink easily adhere to ink repellent layers containing a fluorine-based silane coupling agent and ink repellent layers containing silicon resin. Nonionic surfactants are accompanied by a problem of making ink easily adhere to recording heads and solidify there.

For example, Japanese Patent Application Laid-Open (JP-A) No. 2006-316243 discloses an ink containing a fluorine-based surfactant having a specific chemical structure providing an effect of improving the quality of images and also an effect of reducing the bubbling property and improving the ejection stability of ink.

However, while the fluorine-based surfactant having a chemical structure represented by the following General Formula (A) described in this patent literature provides an effect of reducing the bubbling property and improving the ejection stability of ink, it is poorly effective for improving the quality of images and also the coloring property of the ink. Thus, the disclosed ink cannot dissolve the problem of a poor effect of improving the coloring property of ink.

General Formula (A)

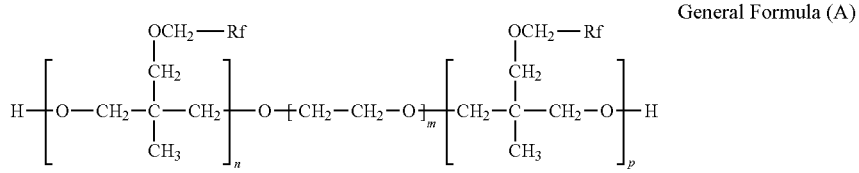

In General Formula (A), Rf represents $CF_3$ or $CF_2CF_3$, n is a real number of 1 to 4, m is a real number of 6 to 25, and p is a real number of 1 to 4.

SUMMARY OF THE INVENTION

Therefore, an object of the present invention is to provide an inkjet recording ink that shows a high ejection reliability and an excellent coloring property even on plain paper and hence can find applications in ink jet recording heads having an ink repellent layer containing a fluorine-based silane coupling agent or an ink repellent layer containing silicon resin without any problem of making ink adhere to the recording head and solidify there and also to provide an ink cartridge, an inkjet recording method and an ink-recorded matter using an ink according to the present invention.

The present invention provides means for achieving the above object as described below.

An inkjet recording ink according to the present invention contains at least a colorant, surfactant A, surfactant B, a water-soluble organic solvent and water, wherein the surfactant A is represented by the following General Formula (1) and the surfactant B is at least one selected from the group consisting of a compound represented by the following General Formula (2a) and a compound represented by the following General Formula (2b):

General Formula (1)

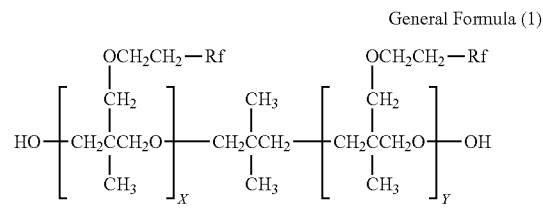

in General Formula (1), Rf represents $CF_3$, $CF_2CF_3$, $(CF_2)_3F$ or $(CF_2)_4F$, and X and Y each are an integer of 1 or greater where $X+Y=4$ or 5, General Formula (2a)

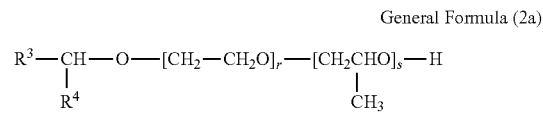

in General Formula (2a), each of $R^3$ and $R^4$ represents a hydrogen atom or an alkyl group having 1 to 20 carbon atoms, r is a real number of 0 to 7, and s is a real number of 1 to 10;

General Formula (2b)

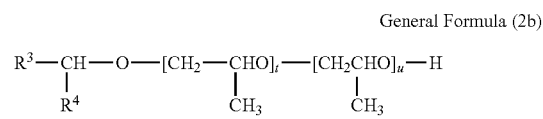

in General Formula (2b), each of $R^3$ and $R^4$ represents a hydrogen atom or an alkyl group having 1 to 20 carbon atoms, t is a real number of 0 to 7, and u is a real number of 1 to 10.

According to the present invention, an ink that can record images of an excellent image quality and alleviate the problem of adhesion of ink to recording heads and solidification thereof is provided by using two surfactants of different types having specific chemical structures. On the other hand, an inkjet recording ink according to the present invention is comparable to conventional ink containing a fluorine-based surfactant from the viewpoint of low bubbling property and ejection stability.

As a result of making an ink contain the fluorine-based surfactant represented by General Formula (1) and the nonionic surfactant which is at least one selected from the group consisting of the compounds represented by General Formulas (2a) and (2b), the obtained ink shows characteristic features similar to conventional ink that the ink has a high viscosity and a low surface tension and the vehicle of the ink permeates quickly into plain paper when plain paper is used for recording (printing) and that the coloring ingredients tend to remain on the surface of plain paper with ease. Additionally, the advantages of the two different surfactants contained an ink according to the present invention offset the problems that arises when ink contains only one of the surfactants, although the mechanism of offsetting the problems is being looked into and yet to be clarified, and the combined used of the two surfactants give rise to an unexpected effect of improving the problem of adhesion of ink to recording heads and solidification thereof. Furthermore, these effects become more remarkable when a specific naphthol-based nonionic surfactant is additionally employed.

DETAILED DESCRIPTION OF THE INVENTION

Inkjet Recording Ink

Figure 1:
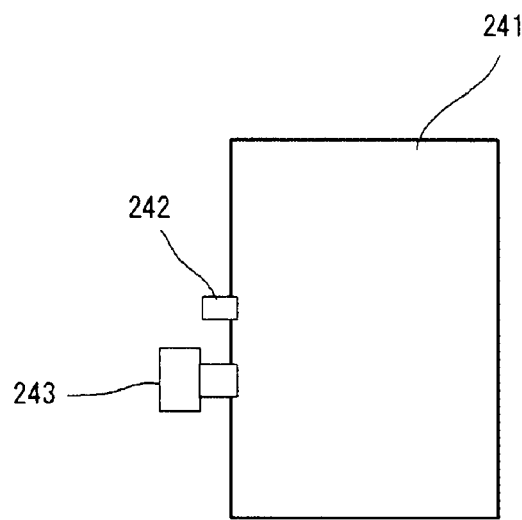
FIG. 1 is a schematic illustration of an embodiment of ink cartridge according to the present invention.

An inkjet recording ink according to the present invention contains at least a colorant, surfactant A, surfactant B, a water-soluble organic solvent and water. If necessary, the inkjet recording ink may further contain one or more other ingredients.

<Surfactants A and B>

The surfactant A is represented by the following General Formula (1).

The surfactant B is at least one selected from the group consisting of a compound represented by the following General Formula (2a) and a compound represented by the following General Formula (2b):

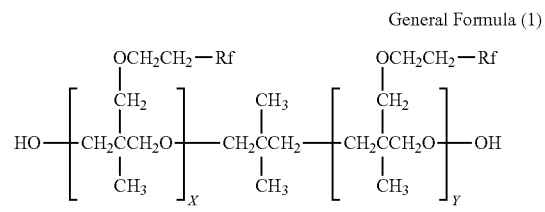

General Formula (1)

in General Formula (1), Rf represents $CF_3$, $CF_2CF_3$, $(CF_2)_3F$ or $(CF_2)_4F$, and X and Y each are am integer of 1 or greater where X+Y=4 or 5.

In General Formula (1), Rf represents preferably a fluorine-containing group, more preferably a perfluoroalkyl group.

The perfluoroalkyl group preferably has 1 to 10 carbon atoms, more preferably has 1 to 3 carbon atoms. Examples of preferable perfluoralkyl groups include $C_nF_{2n-1}$ (where n is an integer of 1 to 10). Specific examples of preferable perfluoroalkyl groups include $CF_3$, $CF_2CF_3$, (CFO 3F and $(CF_2)_4F$, of which $CF_3$ and $CF_2CF_3$ are particularly preferable.

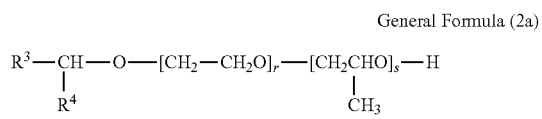

General Formula (2a)

in General Formula (2a), each of $R^3$ and $R^4$ represents a hydrogen atom or an alkyl group having 1 to 20 carbon atoms, r is a real number of 0 to 7, and s is a real number of 1 to 10.

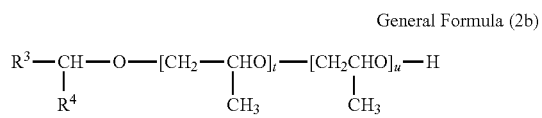

General Formula (2b)

in General Formula (2b), each of $R^3$ and $R^4$ represents a hydrogen atom or an alkyl group having 1 to 20 carbon atoms, t is a real number of 0 to 7, and u is a real number of 1 to 10.

In the above General Formulas (2a) and (2b), each of $R^3$ and $R^4$ represents a hydrogen atom or an alkyl group having 1 to 20 carbon atoms.

The alkyl group preferably has 1 to 20 carbon atoms, more preferably has 1 to 8 carbon atoms. Examples of such alkyl groups include methyl group, ethyl group, propyl group, isopropyl group, butyl group, isobutyl group, sec-butyl group, tert-butyl group, pentyl group, isopentyl group, 1-methylbutyl group, 2-methylbutyl group, tert-pentyl group, hexyl group, cyclopropyl group, cyclobutyl group, cyclopentyl group, cyclohexyl group, cycloheptyl group and cyclooctyl group.

The fluorine-based surfactant represented by General Formula (1) reduces the surface tension of ink and improves the quality of images. Additionally, the fluorine-based surfactant realizes a low bubbling property and hence takes an important role for achieving an excellent ejection stability of ink.

The content ratio of the fluorine-based surfactant represented by General Formula (1) in an inkjet recording ink according to the present invention is preferably 0.01% by mass to 10% by mass, more preferably 0.1% by mass to 5% by mass. The effect of improving the coloring property may not be obtained when the content ratio of the fluorine-based surfactant is less than 0.01% by mass. On the other hand, the storage stability of ink may be reduced when the content ratio of the fluorine-based surfactant exceeds 10% by mass.

The fluorine-based surfactant represented by General Formula (1) is added to an ink liquid medium with at least a nonionic surfactant expressed General Formula (2a) or a nonionic surfactant represented by General Formula (2b) above, to which, if desired, some other surfactant that can be used in combination may or may not be further added according to an established process.

The content ratio of at least a nonionic surfactant represented by General Formula (2a) or a nonionic surfactant represented by General Formula (2b) in an inkjet recording ink according to the present invention is preferably 0.5% by mass to 5% by mass, more preferably 0.1% by mass to 3% by mass. Such a nonionic surfactant exerts an effect of reducing the surface tension of ink and allowing the vehicle to permeate quickly but allowing the coloring ingredients to remain on the surface of paper. However, the nonionic surfactant does not provide a coloring effect when the content ratio is less than 0.5% by mass. On the other hand, the nonionic surfactant makes the ink that contains it to bubble remarkably and gives rise to a problem in terms of ejection stability when the content ratio exceeds 5% by mass.

The fluorine-based surfactant represented by General Formula (1) and the nonionic surfactant which is at least one selected from the group consisting of the compounds represented by General Formulas (2a) and (2b) may be appropriately synthesized for use or those that are commercially available may be used. Examples of commercially available surfactants of the fluorine-based surfactant represented by General Formula (1) include POLYFOX PF7002 (product of Omnova Co.). Examples of commercially available surfactants of the nonionic surfactant which is at least one selected from the group consisting of the compounds represented by General Formulas (2a) and (2b) include SOFTANOL EP9050 (product of Nippon Shokubai Co., Ltd.).

For the purpose of the present invention, other surfactant, preferably one or more surfactants selected from nonionic surfactants containing a naphtol binding site as represented by General Formula (4) shown below, anionic surfactants, amphoteric surfactants and acetylene glycol-based surfactants may additionally be used. Of the above listed agents, the use of nonionic surfactants containing a naphtol binding site as represented by General Formula (4) shown below is particularly preferable:

General Formula (4)

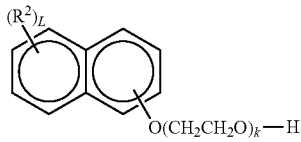

in General Formula (4), $R^2$ represents an alkyl group having 1 to 20 carbon atoms, an aralkyl group having 1 to 20 carbon atoms or an allyl group, L is an integer of 0 to 7, and k is an integer of 20 to 80.

The alkyl group represented by $R^2$ preferably has 1 to 20 carbon atoms, more preferably 1 to 8 carbon atoms. Examples of the alkyl group include methyl, ethyl, propyl, isopropyl, butyl, isobutyl, sec-butyl, tert-butyl, pentyl, isopentyl, 1-methylbutyl, 2-methylbutyl, tert-pentyl, hexyl, cyclopropyl, cyclobutyl, cyclopentyl, cyclohexyl, cycloheptyl and cyclooctyl.

Examples of the aralkyl group represented by $R^2$ include benzyl and phenethyl.

Examples of the allyl group represented by $R^2$ include 2-propenyl.

Examples of anionic surfactants that can be used for the purpose of the present invention include alkyl allyls, alkylnaphthalenesulfonates, alkyl phosphates, alkyl sulfates, alkylsulfonate salts, alkyl ether sulfates, alkyl sulfosuccinate salts, alkylester sulfates, alkylbenzene sulfonates, alkyldiphenylether disulfates, alkylarylether phosphates, alkylarylether sulfates, alkyl aryl ether ester sulfates, olefin sulfonates, alkaneolefin sulfonates, polyoxyethylene alkyl ether phosphates, polyoxyethylene alkyl ether sulfates, ether carboxylates, sulfosuccinates, α-sulfo fatty acid esters, fatty acid salts, condensates of higher fatty acids and amino acids, and naphthenates.

Examples of other nonionic surfactants that can be used for the purpose of the present invention include polyoxyethylenealkylethers, polyoxyethylenealkylallylethers, polyoxyethylenealkylphenylethers, polyoxyethyleneglycolesters, polyoxyethylene fatty acid amides, polyoxyethylene fatty acid esters, polyoxyethylenepolyoxypropyleneglycols, glycerin esters, sorbitan esters, sucrose esters, polyoxyethyleneethers of glycerin esters, polyoxyethyleneethers of sorbitan esters, polyoxyethyleneethers of sorbitol esters, fatty acid alkanolamides, amine oxides, polyoxyethylene alkylamines, glycerin fatty acid esters, sorbitan fatty acid esters, polyoxyethylene sorbitan fatty acid esters, polyoxyethylene sorbitol fatty acid esters and alkyl(poly)glycoxides.

Examples of amphoteric surfactants that can be used for the purpose of the present invention include imidazoline derivatives such as imidazolinium betaine, dimethyl alkyl lauryl betaines, alkyl glycines and alkyldi(aminoethyl)glycines.

Examples of acetylene glycol-based surfactants that can be used for the purpose of the present invention include 2,4,7,9-tetramethyl-5-decyne-4,7-diol and 3,6-dimethyl-4-octine-3,6-diol, 3,5-dimethyl-1-hexine-3-ol (e.g., SURFYNOL 104, 82, 465, 485 or TG; available from Air Products and Chemicals, Inc., U.S.).

Note that the amount of the surfactant can be adjusted within a range that does not obscure the objective and the benefits of the present invention.

<Colorant>

As described above, the present invention encompasses ink sets for inkjet recording including black ink and color inks. At least a pigment, a dye or coloring fine particles can be used as colorant for the purpose of the present invention.

An aqueous dispersion of polymer fine particles that are made to contain a coloring material is preferably employed as the coloring fine particles.

The expression of "made to contain a coloring material" refers to either or both of a state where a coloring material is sealed in polymer fine particles and a state where a coloring material is adsorbed to the surfaces of polymer fine particles. Note that all the coloring material used for a recording ink according to the present invention does not need to be sealed in or adsorbed by polymer fine particles and the coloring material may be dispersed in emulsion within a range that does not obscure the benefits of the present invention. Any coloring materials that are insoluble or hardly soluble to water and can be adsorbed by a polymer may be used for the purpose of the present invention. Thus, an appropriate coloring material should be selected according to the application of the ink to be manufactured.

The expression of "insoluble or hardly soluble to water" means that the coloring material is not dissolved by more than 10 parts by mass in 100 parts by mass of water at 20° C.

"Dissolve" refers to that no separation or precipitation of the coloring material is visually recognizable in the surface layer or in a lower layer of the aqueous solution.

The average particle diameter of polymer fine particles each containing the coloring material (colored fine particles) is preferably 0.16 μm or less in the ink The content ratio of coloring fine particles is preferably 8% by mass to 20% by mass, more preferably 8% by mass to 12% by mass, as solid in a recording ink according to the present invention.

Examples of the colorants include water-soluble dyes, oil-soluble dyes, disperse dyes and pigments, of which oil-soluble dyes and disperse dyes are preferable from the viewpoint of good adsorption/sealing effect, although pigments may preferably be employed from the viewpoint of light-resistance of obtained images.

From the viewpoint of making polymer fine particles impregnated with the selected dye, the dye is dissolved in an organic solvent, e.g., a ketone-based solvent, preferably by 2 g/liter or more, more preferably by 20 g/liter to 600 g/liter.

The water-soluble dyes are acidic dyes, direct dyes, basic dyes, reactive dyes and dyes classified as edible dyes. A dye that is highly water-resistant and light-resistant is preferably employed.

Examples of the acidic dyes and edible dyes include C.I. Acid Yellow 17, 23, 42, 44, 79, 142; C.I. Acid Red 1, 8, 13, 14, 18, 26, 27, 35, 37, 42, 52, 82, 87, 89, 92, 97, 106, 111, 114, 115, 134, 186, 249, 254, 289; C.I. Acid Blue 9, 29, 45, 92, 249; C.I. Acid Black 1, 2, 7, 24, 26, 94; C.I. Food Yellow 3, 4; C.I. Food Red 7, 9, 14; and C.I. Food Black 1, 2.

Examples of the direct eyes include C.I, Direct Yellow 1, 12, 24, 26, 33, 44, 50, 86, 120, 132, 142, 144; C.I. Direct Red 1, 4, 9, 13, 17, 20, 28, 31, 39, 80, 81, 83, 89, 225, 227; C.I. Direct Orange 26, 29, 62, 102; C.I. Direct Blue 1, 2, 6, 15, 22, 25, 71, 76, 79, 86, 87, 90, 98, 163, 165, 199, 202; and C.I. Direct Black 19, 22, 32, 38, 51, 56, 71, 74, 75, 77, 154, 168, 171.

Examples of the basic dyes include C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87, 91; C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109, 112; C. I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147, 155; and C.I. Basic Black 2, 8.

Examples of the reactive dyes include C.I. Reactive Black 3, 4, 7, 11, 12, 17; C.I. Reactive Yellow 1, 5, 11, 13, 14, 20, 21, 22, 25, 40, 47, 51, 55, 65, 67; C.I. Reactive Red 1, 14, 17, 25, 26, 32, 37, 44, 46, 55, 60, 66, 74, 79, 96, 97; and C.I. Reactive Blue 1, 2, 7, 14, 15, 23, 32, 35, 38, 41, 63, 80, 95.

The pigments are not subjected any limitations and an appropriate pigment may be selected according to the application of the ink to be manufactured. For example, an inorganic pigment or an organic pigment may be selected.

Examples of the inorganic pigments include titanium oxide, iron oxide, calcium carbonate, barium sulfate, aluminum hydroxide, barium yellow, cadmium red, chrome yellow and carbon black, of which carbon black is preferable. Carbon black may be manufactured by means of a known process such as contact process, furnace process or thermal process.

Examples of the organic pigments include azo pigments, polycyclic pigments, dye chelates, nitro pigments, nitroso pigments and aniline black, of which azo pigments and polycyclic pigments are preferable. Examples of the azo pigments include azo lake pigments, insoluble azo pigments, condensed azo pigments and chelate azo pigments. Examples of the polycyclic pigments include phthalocyanine pigments, perylene pigments, perinone pigments, anthraquinone pigments, quinacridon pigments, dioxazine pigments, indigo pigments, thioindigo pigments, isoindolinone pigments and quinofuralone pigments. Examples of the dye chelates include basic dye type chelates and acidic dye type chelates.

The pigment colors are not subjected any limitations and hence a black pigment or a color pigment may be appropriately selected. A single pigment may be used. Alternatively, two or more pigments may be used in combination.

Examples of black pigments include carbon blacks (C.I. Pigment Black 7) such as furnace black, lamp black, acetylene black and channel black, metals such as copper, iron (C.I. Pigment Black 11) and titatnium oxide and organic pigments such as aniline black (C.I. Pigment Black 1).

Examples of yellow color pigments include C.I. Pigment Yellow 1 (Fast Yellow G), 3, 12 (Disazo Yellow AAA), 13, 14, 17, 23, 24, 34, 35, 37, 42 (Yellow Iron Oxide), 53, 55, 74, 81, 83 (Diazo Yellow HR), 95, 97, 98, 100, 101, 104, 108, 109, 110, 117, 120, 128, 138, 150 and 153.

Examples of magenta color pigments include C.I. Pigment Red 1, 2, 3, 5, 17, 22 (Brilliant Fast Scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 92, 101 (Red Iron Oxide), 104, 105, 106, 108 (Cadmium Red), 112, 114, 122 (Dimethylquinacridone), 123, 146, 149, 166, 168, 170, 172, 177, 178, 179, 185, 190, 193, 209 and 219.

Examples of cyan color pigments include C.I. Pigment blue 1, 2, 15 (Copper Phthalocyanine Blue R), 15:1, 15:2, 15:3 (Phthalocyanine Blue G), 15:4, 15:6 (Phthalocyainine Blue E), 16, 17:1, 56, 60 and 63.

Examples of intermediate color pigments for red, green and blue include C.I. Pigment Red 177, 194, 224, C.I. Pigment Orange 43, C.I. Pigment Violet 3, 19, 23, 37 and C.I Pigment Green 7, 36.

As pigment, a self dispersion type color pigment having at least a hydrophilic group that can be stably dispersed on the surface of the pigment directly or by way of some other group of atoms is preferably employed. When such a pigment is employed, as a result, no dispersing agent is required to disperse the pigment unlike conventional inks. An ionic self dispersion type pigment is preferable for the purpose of the present invention. Thus, a self dispersion type pigment that is anionically charged or cationically charged is preferably employed.

Examples of the anionic hydrophilic groups include —COOM, —SO$_3$M, —PO$_3$HM, —PO$_3$M$_2$, —SO$_2$NH$_2$ and —SO$_2$NHCOR (where M represents a hydrogen atom, an alkali metal, ammonium or organic ammonium and R represents an alkyl group having 1 to 12 carbon atoms, a phenyl group that may or may not have a substitution group or a naphthyl group that may or may not have a substitution group), of which —COOM and —SO$_3$M bonded to the color pigment surface is preferably employed.

If "M" in the hydrophilic group is an alkali metal, examples of alkali metal include lithium, sodium and potassium. If "M" is organic ammonium, examples of organic ammonium include mono- to tri-methyl ammoniums, mono- to tri-ethyl ammoniums and mono- to tri-methanol ammoniums. Methods of obtaining an anionically charged color pigment that can be used for the purpose of the present invention include methods of introducing —COONa to the color pigment surface, which by turn include a method of an oxidation treatment of the color pigment by means of hypochlorous acid, a sulfonation method and a method of causing a diazonium salt to react.

Preferable examples of cationic hydrophilic groups are quaternary ammonium groups. A quaternary ammonium group bonded to the pigment surface can suitably be used for a coloring material.

Methods of manufacturing cationic self dispersion type carbon black include a method of treating carbon black with 3-amino-N-ethylpyridinium bromide as bonding an N-ethylpyridyl group, although the present invention is limited thereto.

For the purpose of the present invention, the hydrophilic group may be bonded to the surface of carbon black by way of some other group of atoms. Some other group of atoms may be, for example, an alkyl group having 1 to 12 carbon atoms, a phenyl group that may or may not have a substitution group or a naphthyl group that may or may not have a substitution group. A specific examples of some other group of atoms by way of which the hydrophilic group is bonded to the surface of carbon black include —$C_2H_4COOM$ (where M represents an alkali metal or a quaternary ammonium), —$PhSO_3M$ (where Ph represents a phenyl group and M represents an alkali metal or a quaternary ammonium) and —$C_5H_{10}NH_3^+$, although the present invention is limited thereto.

For the purpose of the present invention, a pigment dispersion liquid prepared by using a pigment dispersing agent may be used.

Examples of pigment dispersing agents include vegetable polymers such as gum arabic, gum tragacanth, guar gum, Karaya gum, locust bean gum, Arabinogalactan, pectin, and quince seed starch, seaweed-based polymers such as alginic acid, carrageenan and agar, animal polymers such as gelatin, casein, albumin and collagen and mirobe-based polymers such as xanthane gum and dextran, all of which are hydrophilic polymers.

Examples of semi-synthetic dispersing agents include cellulose-based polymers such as methyl cellulose, ethyl cellulose, hydroxyethyl cellulose, hydroxypropyl cellulose and carboxymethyl cellulose, starch-based polymers such as sodium carboxymethyl starch and sodium starch phosphate and seaweed-based polymers such as sodium alginate and propylene glycol alginate. Examples of pure synthetic dispersing agents include vinyl-based polymers such as polyvinyl alcohol, polyvinyl pyrrolidone and polyvinyl methyl ether, acryl-based resins such as non-crosslinked polyacrylamide, polyacrylic acid or alkali metal salts thereof and water-soluble styrene acrylic resin, water-soluble styrene-maleic acid resins, water-soluble vinylnaphthalene-acrylic resins, water-soluble vinylnaphthalene maleic acid resins, polyvinyl pyrrolidones, polyvinyl alcohols, and β-naphthalene sulfonic acid/formalin condensates, polymer compounds having a salt of a cationic functional group such as quaternary ammonium or amino group attached to a side chain and natural polymer compounds such as shellac. Of these, a polymer dispersing agent of a homopolymer of acrylic acid, methacrylic acid or styrene/acrylic acid or a copolymer of monomers having some other hydrophilic group obtained by introducing a carboxylic acid group is particularly preferable.

The above listed copolymers have a weight average molecular weight of preferably 3,000 to 50,000, more preferably 5,000 to 30,000, most preferably 7,000 to 15,000.

The mixture mass ratio of the pigment and the dispersing agent is preferably 1:0.06 to 1:3, more preferably 1:0.125 to 1:3.

The ratio of the pigment added as colorant in recording ink is preferably 0.5% by mass to 25% by mass, more preferably 2% by mass to 15% by mass. Generally, the image density rises and the image quality is improved as the concentration of the pigment rises. Then, however, the fixability, the ejection stability and the anti-clogging reliability of ink can easily be adversely affected. However, according to the present invention, a good fixability can be secured while the ejection stability and the anti-clogging reliability of ink are maintained if the ratio of the added pigment rises.

<Water-Soluble Organic Solvent>

While water and a water-soluble organic solvent are used as liquid medium for a recording ink according to the present invention, the water-soluble organic solvent may also be used for the purpose of making the ink to show desired physical properties, preventing ink from drying and improving the dissolution stability of the ink.

Examples of water-soluble organic solvents that can be used for the purpose of the present invention include polyvalent alcohols such as ethylene glycol, diethylene glycol, triethylene glycol, polyethylene glycol, propylene glycol, dipropylene glycol, tripropylene glycol, polypropylene glycol, 1,3-propanediol, 1,3-butanediol, 2,3-butanediol, 1,4-butanediol, 3-methyl-1,3-butanediol, 1,5-pentanediol, 1,6-hexanediol, tetraethylene glycol, 1,6-hexanediol, 2-methyl-2,4-pentanediol, 3-methyl-1,5-pentanediol, thiodiglycol, glycerin, 1,2,6-hexanetriol, 1,2,4-butanetriol, 1,2,3-butanetriol and petriol; polyvalent alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether; polyvalent alcohol aryl ethers such as ethylene glycol monophenyl ether and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimidazolidine and ε-caprolactum; amides such as formamide, N-methyl formamide, formamide and N,N-dimethylformamide; amines such as monoethanol amine, diethanol amine, triethanol amine, monoethyl amine, diethyl amine and triethyl amine; sulfur-containing compounds such as dimethyl sulfoxide, sulfolane and thiodiethanol; propylene carbonate, ethylene carbonate and γ-butyrolactone. Any of these solvents may be used alone, in combination with water or in combination with water and/or one or more other solvents.

Of the above-listed solvents, glycerin, ethylene glycol, diethylene glycol, triethylene glycol, propylene glycol, dipropylene glycol, tripropylene glycol, 1,3-butanediol, 2,3-butanediol, 1,4-butanediol, 3-methyl-1,3-butanediol, 1,5-pentanediol, tetraethylene glycol, 1,6-hexanediol, 2-methyl-2,4-pentanediol, 3-methyl-1,5-pentanediol, polyethylene glycol, 1,2,4-butanetriol, 1,2,6-hexanetriol, thiodiglycol, 2-pyrrolidone, N-methyl-2-pyrrolidone and N-hydroxyethyl-2-pyrrolidon are preferable and 3-methyl-1,3-butanediol, 2-methyl-2,4-pentanediol, 1,3-butanediol and 3-methyl-1,5-pantanediol are particularly preferable.

The content ratio of the water-soluble organic solvent(s) in a recording ink according to the present invention is preferably 10% by mass to 50% by mass, more preferably 20% by mass to 40% by mass.

If necessary, one or more water-soluble organic solvents may additionally be used in combination with one or more of the above-listed water-soluble organic solvents for a recording ink according to the present invention. Examples of such other water-soluble organic solvents include saccharides. The saccharides include simple sugars, disaccharides, oligosaccharides (including trisaccharides and tetrasaccharides), polysaccharides and derivatives of any of them, of which glucose, mannose, fructose, ribose, xylose, arabinose, galactose, maltose, cellobiose, lactose, sucrose, trehalose and maltotriose are preferable. The polysaccharides refer to sugars in a broad sense of the word and may be used to include sugar substances that are found in nature such as α-cyclodextrin and cellulose.

Examples of derivatives of the saccharides include reducing sugars of the saccharides (e.g., sugar alcohols (as represented by General Formula: $HOCH_2(CHOH)_nCH_2OH$ (where n is an integer of 2 to 5)), oxidizing sugars (e.g., aldonic acid and uronic acid), amino acid and thio acid, of which sugar alcohols are particularly preferable. Examples of the sugar alcohols include maltitol and sorbitol.

The content ratio of the saccharide in the recording ink is preferably 0.1% by mass to 40% by mass, more preferably 0.5% by mass to 30% by mass.

[Other Additives]
(Moisture Retaining Property Maintaining Agent)

If desired, a recording ink according to the present invention can be made to contain a urea or an alkyl glycine. Examples of ureas to be used for the purpose of the present invention include urea, thiourea, ethylene urea and 1,3-dimethyl-2-imidazolidinone. Examples of alkyl glycines that can be used for the purpose of the present invention include N-methylglycine, N,N-dimethylglycine and N-ethylglycine. Basically, both ureas and alkyl glycines maintain the moisture retaining property (and hence the storage stability) of water-based ink and provide a remarkable effect on the ejection stability and the anti-clogging reliability of recording heads of inkjet printers. They also allow to adjust the viscosity and the surface tension of ink. Thus, they make ink highly resistant against clogging and prevent defective ejections of ink droplets that give rise to curved trajectories of ink droplets.

The content ratio of the urea or the alkyl glycine added to the ink is preferably 0.5% by mass to 50% by mass, more preferably 1% by mass to 20% by mass. The added urea or alkyl glycine cannot provide inkjet printer recording heads with required characteristics when its content ratio is less than 0.5% by mass, whereas the ink containing it becomes excessively viscous to adversely affect the storage stability of the ink and give rise to defective ejections of ink droplets when its content ratio exceeds 50% by mass.

<Water>

The water is, for example, pure water or ultra-pure water such as ion exchange water, ultrafiltrated water, reverse osmosis water and distilled water.

<Other Ingredients>

Other ingredients as described above are not subjected to any particular limitations and hence may be used appropriately whenever necessary. Examples of such other ingredients include resin fine particles, anti-septic/anti-mold agents, pH adjusting agents, anti-rust agents, anti-oxidation agents, ultraviolet absorbing agents, oxygen absorbing agents and light stabilizing agents.

—Resin Fine Particles—

The resin fine particles are not subjected to any particular limitations and hence any resin fine particles can be selected appropriately according to the application of the ink to be manufactured. However, fine particles of silicone modified acrylic resin that can be obtained by polymerization of acryl-based monomers and a silane compound in the presence of emulsifying agent provide a suitable example.

—Anti-Septic/Anti-Mold Agent—

Examples of the anti-septic/anti-mold agents include 1,2-benzisothiazolin-3-one, sodium dehydroacetate, sodium sorbate, 2-pyridinethiol-1-oxidesodium, sodium benzoate and pentachlorophenol sodium.

—pH Adjusting Agent—

The pH adjusting agents are not subjected to any particular limitations and any pH adjusting agent can be used so long as it can adjust the pH to 7 or higher without adversely affecting the prepared ink. Thus, an appropriate pH adjusting agent should be selected according to the application of the ink to be manufactured.

Examples of the pH adjusting agents include amines such as diethanol amine and triethanol amine, hydroxides of alkali metals such as lithium hydroxide, sodium hydroxide and potassium hydroxide, ammonium hydroxide, quaternary ammonium hydroxide, quaternary phosphnium hydroxide and carbonates of alkali metals such as lithium carbonate, sodium carbonate and potassium carbonate.

—Anti-Rust Agent—

Examples of the anti-rust agents include acid sulfites, sodium thiosulfate, ammonium thiodiglycolic acid, diisopropylammonium nitrite, pentaerythritol tetranitrate and dicyclohexylammonium nitrite.

—Anti-Oxidation Agent—

Examples of the anti-oxidation agents include phenol-based anti-oxidation agents (including hindered phenol-based anti-oxidation agents), amine-based anti-oxidation agents, sulfur-based anti-oxidation agents and phosphor-based anti-oxidation agents.

Examples of the phenol-based anti-oxidation agents (including hindered phenol-based anti-oxidation agents) by turn include butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2-2'-methylenebis(4-ethyl-6-tert-butylphenol, 4,4'-butylidenebis(3-methyl-6-tert-butylphenol), 3,9-bis[1,1-dimethyl-2-[β-(3-tert-butyl-4-hydroxy-5-methylphenyl)propionyloxy]ethyl]-2,4,8,10-tetraoxaspiro[5,5]undecane, 1,1,3-tris(2-methyl-4-hydroxy-5-tert-butylphenyl)butane, 1,3,5-trimethyl-2,4,6-tris(3,5-di-teret-butyl-4-hydroxybenzyl) benzene and tetrakis[methylene-3-(3',5'-di-tert-butyl-4'-hydroxyphenyl) propionate)methane.

Examples of the amine-based anti-oxidation agents include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6,-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4-thiobis(3-methyl-6-tert-butylphenol), tetrakis[methylene-3(3,5-di-tert-butyl-4-dihydrorxyphenyl) propionate] methane and 1,1,3-tris(2-methyl-4-hydroxy-5-tert-butylphenyl)butane.

Examples of the sulfur-based anti-oxidation agents include dilauryl 3,3'-thiodipropionate, distearylthiodipropionate, laurylstearylthiodipropionate, dimyristyl 3,3'-thiodipropionate, distearyl β,β'-thiodipropionate, 2-mercaptobenzimidazole and dilauryl sulfide.

Examples of the phosphor-based anti-oxidation agents include triphenyl phosphite, octadecyl phosphite, triisodecyl phosphite, trilauryl trithiophosphite and trinonylphenyl phosphite.

—Ultraviolet Absorbing Agent—

Examples of the ultraviolet absorbing agents include benzophenone-based ultraviolet absorbing agents, benzotriazole-based ultraviolet absorbing agents, salicylate-based ultraviolet absorbing agents, cyanoacrylate-based ultraviolet absorbing agents and nickel complex salt-based ultraviolet absorbing agents.

Examples of the benzophenone-based ultraviolet absorbing agents include 2-hydrorxy-4-n-octoxybenzophenone, 2-hydroxy-4-n-dodecyloxybenzophenone, 2,4-dihydroxybenzophenone, 2-hydroxy-4-methoxybenzophenone and 2,2',4,4'-tetrahydroxybenzophenone.

Examples of the benzotriazole-based ultraviolet absorbing agents include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole and 2-(2'-hydroxy-3'-tert-butyl-5'-methylphenyl)-5-chlorobenzotriazole.

Examples of the salicylate-based ultraviolet absorbing agents include phenyl salicylate, p-tert-butylphenylsalicylate and p-octylphenylsalicylate.

Examples of the cyanoacrylate-based ultraviolet absorbing agents include ethyl-2-cyano-3,3'-diphenylacrylate, methyl-2-cyano-3-methyl-3-(p-methoxyphenyl)acrylate and butyl-2-cyano-3-methyl-3-(p-methoxyphenyl)acrylate.

Examples of the nickel complex salt-based ultraviolet absorbing agents include nickelbis(octylphenyl)sulfide, 2,2'-thiobis(4-tert-octylphelate)-n-butylaminenickel(II), 2,2'-thiobis(4-tert-octylphelate)-2-ethylhexylaminenickel(II) and 2,2'-thiobis(4-tert-octylphelate)triethanolaminenickel(II).

[Ink Preparation Method]

A recording ink according to the present invention is manufactured by dispersing or dissolving at least water, a colorant, surfactant A, surfactant B, a water-soluble organic solvent and, if necessary, other ingredient(s) in water and, if necessary agitating and mixing the ingredients. The dispersion can be performed by means of, for example, a sand mill, a homogenizer, a ball mill, a paint shaker or an ultrasonic dispersion machine. The agitation and mixing can be performed by means of an ordinary agitator using agitation blades, a magnetic stirrer or a high-speed dispersion machine.

[Physical Properties of Ink]

Physical properties of a recording ink according to the present invention can be appropriately selected without limitations according to the application of the ink. For example, the viscosity, the surface tension, the pH value and other properties are preferably found within the following respective ranges.

The viscosity of ink is preferably 5 mPa·s to 20 mPa·s, more preferably 5 mPa·s to 10 mPa·s at 25° C. It may be difficult to secure the ejection stability of the ink when the viscosity thereof goes out of the above range.

The surface tension of ink is preferably 22 mN/m to 55 mN/m at 20° C. The printing realized by means of an ink according to the present invention may be blurred remarkably and ink may not be ejected stably when the surface tension falls below the lower limit, whereas ink may not permeate paper sufficiently and ink may require a long time for drying when the surface tension exceeds the upper limit.

The pH value is preferably 7 to 10.

As pointed out earlier, a recording ink according to the present invention can be made to show any color without limitations and any color can be appropriately selected according to the application of the ink. Colors that can be used include yellow, magenta, cyan and black. A multicolor image can be formed by using an ink set of two or more inks showing different ones of these colors and a full color image can be formed by using an ink set of inks of all these colors.

A stimulus for driving ink droplets to fly can be generated by a stimulus generating means. The stimulus is not limited to any limitations and can be selected appropriately according to the application of ink droplets. Stimuli that can be used include heat (temperature), pressure, vibration and light. One of these stimuli may be used alone or two or more of them may be used in combination. Of the above listed stimuli, heat and pressure are preferable.

Examples of the stimulus generating means include heaters, pressure devices, piezoelectric elements, vibration generating devices, ultrasonic wave oscillators and light. More specifically, they include piezoelectric actuators such as piezoelectric elements, thermal actuators designed to utilize a phase change due to film boiling of liquid by an electrothermal conversion element such as a heat element, shape memory alloy actuators that utilize a metal phase change due to a temperature change and electrostatic actuators that utilize electrostatic force.

The mode of flying of droplets of the recording ink is not subjected to any particular limitations and may vary depending on the type of stimulus applied to ink droplets. For example, when the stimulus is "heat", thermal energy that corresponds to a recording signal is applied to the recording ink contained in a recording head to cause the recording ink to bubble typically by means of a thermal head. Then, the recording ink is ejected as a jet of ink droplets from the nozzle holes of the recording head under the pressure of the bubbles. When the stimulus is "pressure", a voltage is applied to a piezoelectric element bonded to the pressure chamber arranged in an ink flow path of the recording head. Then, the piezoelectric element is bent to reduce the volume of the pressure chamber so that the recording ink is ejected as a jet of ink droplets from the nozzle holes of the recording head.

The size of droplets to be made to fly is preferably 3 pl to 40 pl and the ejection speed is preferably 5 m/s to 20 m/s, while the drive frequency is preferably 1 kHz or more and the resolution is preferably about 118 dot/cm (300 dpi) or more.

The control means for controlling the operation of the stimulus generating means is not subjected to any particular limitations so long as it can control the operation and an appropriate means may be selected according to the application of the stimulus generating means. Examples of the control means include sequencers and computers.

A recording ink according to the present invention can find applications in printers having various inkjet heads including so-called piezo-type heads that employ a piezoelectric element as pressure generating means for applying pressure to the ink in the ink flow path of the inkjet head to deform the vibration plate that forms the wall surface of the ink flow path so as to make the volume in the ink flow path vary and eject ink droplets (see JP-A No. 02-51734), so-called thermal-type heads that employ a heat element to heat the ink in the ink flow path of the inkjet head to make the ink bubble (see JP-A No. 61-59911) and electrostatic type heads in which the vibration plate that forms the wall surface of the ink flow path and an electrode are arranged opposite to each other in order to deform the vibration plate by the electrostatic force generated between the vibration plate and the electrode, which by turn make the volume in the ink flow path to vary and eject ink droplets (see JP-A No. 06-71882).

A recording ink according to the present invention can be used in various fields. Particularly, it can find applications in the field of image forming apparatus (e.g., printers) employing an inkjet recording system that has a function of heating both the sheet of paper to be used for printing and the recording ink in the system to 50° C. to 200° C. at the time of printing and before and after thereof to promote fixation of the printed image. Thus, the recording ink can particularly suitably be used for an ink cartridge, an ink-recorded matter, an inkjet recording apparatus and an inkjet recording method according to the present invention, which will be described below.

(Ink Cartridge)

An ink cartridge according to the present invention contains a recording ink according to the present invention in a container thereof and includes components that may be appropriately selected according to the application thereof.

The container is not subjected to any particular limitations and the shape, the structure, the size and the material thereof may be appropriately selected according to the application of the ink cartridge. Examples of containers that can be used for the purpose of the present invention include ink bags made of aluminum laminate film and those made of resin film.

Figure 2:
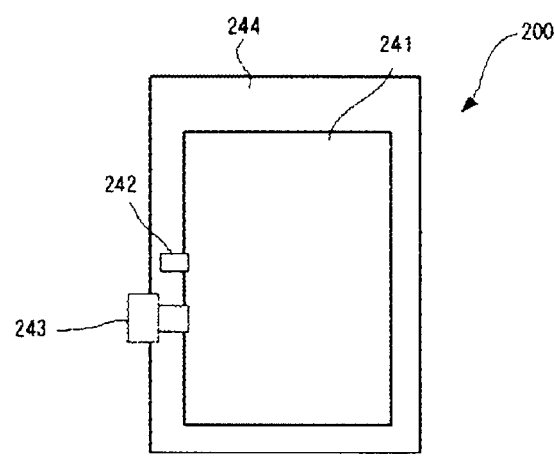
FIG. 2 is a schematic illustration of the ink cartridge of FIG. 1 shown with a case (sheath) thereof.

Now, the ink cartridge will be described further below by referring to FIGS. 1 and 2. FIG. 1 is a schematic illustration of an embodiment of ink cartridge according to the present invention and FIG. 2 is a schematic illustration of the ink cartridge of FIG. 1 shown with a case (sheath) thereof.

As shown in FIG. 1, an ink bag 241 of an ink cartridge 200 is filled with ink by way of an ink inlet port 242 and the air in the inside of the bag is evacuated. Then, the ink inlet port 242 is fusion-sealed. For use, a needle is driven into an ink discharge port 243 that is formed as a rubber member and then ink can be supplied to an inkjet recording apparatus.

The ink bag 241 is made of a bag-forming material such as an air-impermeable aluminum laminate film. As shown in FIG. 2, the ink bag 241 is contained in a cartridge case 244 that is normally made of plastic so that it can be removably loaded in an inkjet recording apparatus of any of various types.

(Inkjet Recording Apparatus)

An ink (or ink set) for inkjet recording according to the present invention can be contained in an ink cartridge according to the present invention, which by turn can be removably loaded in an inkjet recording apparatus of any of various types for use. Particularly, the ink cartridge is preferably removably loaded in an inkjet recording apparatus according to the present invention to be described below.

An inkjet recording apparatus according to the present invention includes at least a means for driving ink to fly along with other components such as a stimulus generating means and a control means that may be appropriately selected according to the application thereof. Thus, an inkjet recording method according to the present invention includes a step of driving ink to fly along with other steps such as a stimulus generating step and a control step that may be appropriately selected according to the application thereof.

The inkjet recording method according to the present invention can suitably be carried out by the inkjet recording apparatus according to the present invention and includes a step of driving ink to fly that can suitably be carried out by the means for driving ink to fly as well as other steps that can suitably be carried out respectively by the other means of the inkjet recording apparatus.

<Step of Driving Ink to Fly and means for Driving Ink to Fly>

The step of driving ink to fly is a step of applying a stimulus to a recording ink according to the present invention to drive the ink to fly and form an image.

The means for driving ink to fly is a means for applying a stimulus to a recording ink according to the present invention to drive the ink to fly and form an image. The means for driving ink to fly is not subjected to any particular limitations and may appropriately be selected from various ink ejection nozzles and other means.

The inkjet head of an inkjet recording apparatus according to the present invention includes a liquid chamber section, a fluid resistance section, a vibration plate and a nozzle member, at least part of which is preferably formed by using a material containing at least silicon or nickel.

The diameter of the inkjet nozzle is preferably 30 µm or less, more preferably 1 µm to 20 µm.

Figure 3:
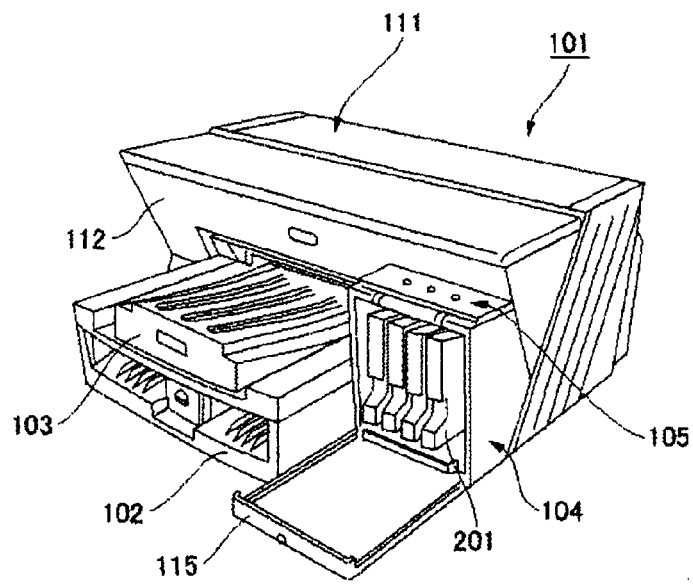
FIG. 3 is a schematic perspective view of an inkjet recording apparatus according to the present invention with the cover of the ink cartridge loading section held in an opened state.

Now, a mode of carrying out the inkjet recording method according to the present invention by means of the inkjet recording apparatus will be described below by referring to the related drawings. The inkjet recording apparatus illustrated in FIG. 3 includes an apparatus main body 101, a sheet feed tray 102 for sequentially feeding sheets of paper loaded in the apparatus main body 101, a sheet delivery tray 103 for storing the sheets of paper that are loaded in the apparatus main body 101 and on which images have been recorded (formed), and an ink cartridge loading section 104.

An operation section 105 that includes operation keys and a display is arranged on the top surface of the ink cartridge loading section 104. The ink cartridge loading section 104 has a front cover 115 that can be opened and closed when loading and removing ink cartridges 201.

Figure 4:
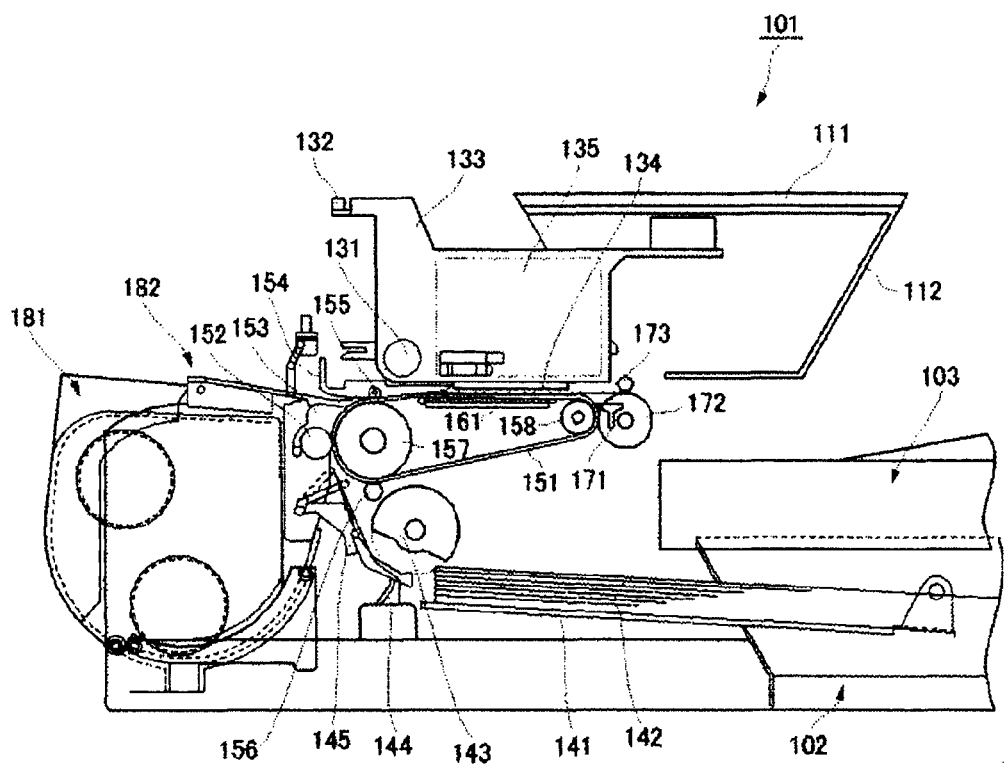
FIG. 4 is a schematic illustration of an inkjet recording apparatus according to the present invention, showing the overall configuration thereof.
Figure 5:
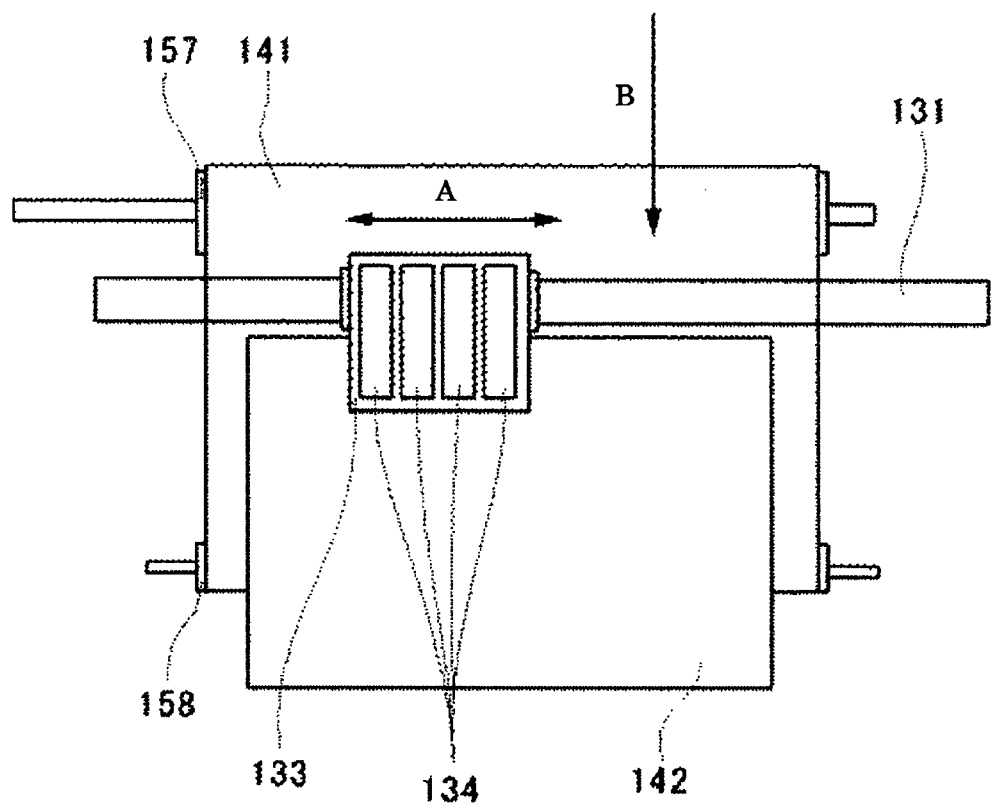
FIG. 5 is an enlarged schematic illustration of an example of inkjet head that can be used for an inkjet recording apparatus according to the present invention.

As shown in FIGS. 4 and 5, the apparatus main body 101 includes a guide rod 131 and a stay 132 that are guide members transversally extending between the lateral side plates (not shown) of the apparatus main body 101 to hold a carriage 133 so as to allow it to slide in the main scanning directions and scan in the directions indicated by arrow A in FIG. 5 by means of a main scanning motor (not shown).

The carriage 133 has four inkjet recording heads 134 that are inkjet recording heads ejecting recording ink droplets of four colors of yellow (Y), cyan (C), magenta (M) and black (Bk) from respective ink ejection ports that are arranged in a direction intersecting the main scanning directions, the direction of ejecting ink droplets facing downward.

The recording heads 134 that are inkjet recording heads are equipped with respective energy generating means for ejecting recording inks that may be piezoelectric actuators such as piezoelectric elements, thermal actuators designed to utilize a phase change due to film boiling of liquid by an electrothermal conversion element such as a heat element, shape memory alloy actuators that utilize a metal phase change due to a temperature change or electrostatic actuators that utilize electrostatic force.

The carriage 133 is quipped with sub-tanks 135 of the different colors for supplying inks of the colors to the respective recording heads 134. A recording ink according to the present invention is supplied to each of the sub-tanks 135 from the corresponding one of the ink cartridges 201 loaded in the ink cartridge loading section 105 by way of a recording ink supply tube (not shown).

The sheet feed section of the inkjet recording apparatus for sequentially feeding sheets of paper 142 loaded on the sheet carrying section (pressure plate) 141 of the sheet feed tray 102 includes a semicircular roller (sheet feed roller) 143 for separating the sheets of paper 142 one after another and feeding them one by one from the sheet carrying section 141 and a separation pad 144 disposed opposite to the sheet feed roller 143 and made of a material showing a high coefficient of friction. The separation pad 144 is urged toward the sheet feed roller 143.

The conveyer section of the inkjet recording apparatus for conveying the sheets of paper 142 fed from the sheet feed section under the recording heads 134 includes a conveyor belt 151 for electrostatically adsorbing a sheet of paper 142 and conveying it, a counter roller 152 for conveying the sheet of paper 142 fed from the sheet feed section by way of guide 145 by pinching it between itself and the conveyor belt 151, a conveyance guide 153 for shifting the moving direction of the sheet of paper 142 that is coming substantially vertically upward by about 90° and making it lay flat on the conveyor belt 151 and a front pressure roller 155 urged toward the conveyor belt 151 by a keep member 154. A charge roller 156 that is a charging means for charging the surface of the conveyor belt 151 with electricity is also provided.

The conveyor belt 151 is an endless belt extending between a conveyance roller 157 and a tension roller 158 so as to turn in the conveyance direction of the belt indicated by arrow B in FIG. 5. The conveyor belt 151 typically has an about 40 µm-thick surface layer that operates as sheet adsorbing surface and is not controlled for resistance and made of a resin material such as an ethylene and tetrafluoroethylene copolymer (ETFE) and a back layer (middle resistance layer, ground layer) that is made of the material same as the surface layer and whose electric resistance is controlled by carbon. A guide member 161 is arranged on the rear side of the conveyor belt 151 to correspond to the printing region of the recording heads 134. The sheet delivery section of delivering the sheets of paper 142 on which images are recorded by the recording heads 134 includes a separation claw 171 for separating a sheet of paper 142 from the conveyor belt 151 and sheet delivery rollers 172 and 173. The sheet delivery tray 103 is arranged below the sheet delivery roller 172.

A duplex printing sheet feed unit 181 is removably mounted on a rear side of the apparatus main body 101. The duplex printing sheet feed unit 181 takes in the sheet of paper 142 that is returned by the conveyor belt 151 that is being driven to rotate in opposite sense, turns it upside down and feeds it back between the counter roller 152 and the conveyor belt 151. A manual sheet feed section 182 is arranged on the top surface of the duplex printing sheet feed unit 181.

In the inkjet recording apparatus, sheets of paper 142 are separated and fed one by one from the sheet feed section and the sheet of paper 142 that is being fed substantially vertically upward is guided by the guide 145 and conveyed further as it is pinched between the conveyor belt 151 and the counter roller 152. Further, the tip of the sheet of paper 142 is guided by the conveyance guide 153 and pressed against the conveyor belt 151 by the front pressure roller 155. Then, the moving direction of the sheet of paper 142 is shifted by about 90°.

At this time, the conveyor belt 157 is electrically charged by the charge roller 156 and the sheet of paper 142 is electrostatically adsorbed and conveyed by the conveyor belt 151. Then, the recording heads 134 are driven according to the image signal supplied to the apparatus, while the carriage 133 is being moved, and ink droplets are ejected toward the sheet of paper 142 that is now held still to record an image for a line. Subsequently, the sheet of paper 142 is conveyed by a predetermined distance and an image is recorded for the next line. The recording operation is terminated when the apparatus receives a recording completion signal or a signal telling that the rear edge of the sheet of paper 142 has got to the recording zone and the sheet of paper 142 is discharged onto the delivery tray 103.

When a state where ink is nearly gone from any of the sub-tanks 135 is detected, a predetermined quantity of recording ink of the corresponding color is supplied from the corresponding one of the ink cartridges 201 to the sub-tank 135.

In the inkjet recording apparatus, when the recording ink contained in any of the ink cartridges 201 has been consumed away, the cabinet of the ink cartridge 201 may be decomposed and only the ink bag may be replaced. Recording inks can be supplied on a stable basis if the ink cartridges 201 are held vertically and loaded on the front side of the ink cartridge loading section.

Accordingly, even if the apparatus main body 101 is arranged with its upper side blocked, for example, even if the apparatus main body 101 is contained in a rack, or something is placed on the top of the apparatus main body 101, any of the ink cartridges 201 can be easily replaced.

While a serial type (shuttle type) inkjet recording apparatus in which a carriage is driven for scanning is described above, the present invention is also applicable to a line type inkjet recording apparatus provided with line type heads.

An inkjet recording apparatus and an inkjet recording method according to the present invention are applicable to various recording operations using an inkjet recording system. For example, they can particularly suitably find applications in inkjet recording printers, facsimile apparatus, copying apparatus, printer/fax/copier composite machines.

(Ink-Recorded Matter)

The present invention also provides an ink-recorded matter formed by means of an inkjet recording apparatus and an inkjet recording method according to the present invention. An ink-recorded matter according to the present invention carries an image formed on a recording medium by means of one or more recording inks according to the present invention.

Recording mediums that can be used for the purpose of the present invention are not subjected to any particular limitations and an appropriate recording medium may be selected according to the application of the ink-recorded matter. Examples of recording mediums include plain paper, glossy paper, special paper, fabric and OHP sheets. Any of these mediums can be used alone or two or more of them may be used in combination.

The ink-recorded matter shows a high quality image with a high degree of temporal stability and is free from blurs. Therefore, the ink-recorded matter can find suitable applications in the field of reference materials carrying various printed letters and images recorded thereon.

EXAMPLES

Now, the present invention will be described further by way of examples although the present invention is limited to the examples that are described below.

Preparation Example 1 of Coloring Material Dispersion

Preparation of Cyan Dispersion

—Preparation of Polymer Solution—

Firstly, referring to Preparation Example 3 described in JP-A No. 2001-139849, a 1-L flask equipped with a mechanical agitator, a thermometer, an nitrogen gas introduction pipe, a reflux pipe and a dropping funnel was purged with nitrogen gas before preparing a polymer solution. Subsequently, 11.2 g of styrene, 2.8 g of acrylic acid, 12.0 g of lauryl methacrylate, 4.0 g of polyethylene glycol methacrylate, 4.0 g of styrene macromer (AS-6: tradename, available from Toagosei Co., Ltd.) and 0.4 g of mercaptoethanol were put into the flask as starting materials and the temperature of the inside of the flask was raised to 65° C. Then, a mixture solution of 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer (AS-6: tradename, available from Toagosei Co., Ltd.), 3.6 g of mercaptoethanol, 2.4 g of azobis dimethylvaleronitrile and 18 g of methyl ethyl ketone was dropped into the flask for 2.5 hours.

After the completion of the dropping, a mixture solution of 0.8 g of azobis dimethylvaleronitrile and 18 g of methyl ethyl ketone was dropped into the flask for 0.5 hours. The solution in the flask was allowed to mature at 65° C. for 1 hour and then 0.8 g of azobis dimethylvaleronitrile was added. Then, the solution was allowed to further mature for 1 hour. After the completion of the reaction, 364 g of methyl ethyl ketone was added to the inside of the flask to obtain 800 g of a polymer solution of a concentration of 50% by mass. Subsequently, part of the polymer solution was dried and observed by means of gel permeation chromatography (standard: polystyrene, solvent: tetrahydrofuran) to find that the mass average molecular weight was 15,000.

—Preparation of Cyan Dispersion—

28 g of the obtained polymer solution, 26 g of copper phthalocyanine pigment, 13.6 g of 1 mol/L aqueous solution of potassium hydroxide, 20 g of methyl ethyl ketone and 30 g of ion exchange water were agitated sufficiently. Thereafter, the mixture was kneaded 20 times by means of a triple roll mill (NR-84A: tradename, available from Noritake Co., Ltd.). The obtained paste was put into 200 g of ion exchange water and agitated sufficiently. Subsequently, the methyl ethyl ketone and the water were removed by distillation by means of an evaporator to obtain 160 g of a blue polymer fine particle dispersion containing a solid fraction by 20.0% by mass.

The volume standard average particle diameter (D50%) of the obtained polymer fine particles was 98 nm when observed by means of a particle diameter distribution measuring instrument (Microtrac UPA: tradename, available from Nikkiso Co., Ltd.).

Example 2 of Preparation of Coloring Material Dispersion

Preparation of Magenta Dispersion

A magenta polymer fine particle dispersion (solid fraction: 20% by mass) was obtained as in Preparation Example 1 except that the copper phthalocyanine pigment was replaced by pigment C.I. Pigment Red 122.

The volume standard average particle diameter (D50%) of the obtained polymer fine particles was 124 nm when observed by means of a particle diameter distribution measuring instrument (Microtrac UPA: tradename, available from Nikkiso Co., Ltd.).

Example 3 of Preparation of Coloring Material Dispersion

Preparation of Yellow Dispersion

A yellow polymer fine particle dispersion (solid fraction: 20% by mass) was obtained as in Preparation Example 1 except that the copper phthalocyanine pigment was replaced by pigment C.I. Pigment Yellow 74.

The volume standard average particle diameter (D50%) of the obtained polymer fine particles was 78 nm when observed by means of a particle diameter distribution measuring instrument (Microtrac UPA: tradename, available from Nikkiso Co., Ltd.).

Example 4 of Preparation of Coloring Material Dispersion

Preparation of Black Dispersion

A black polymer fine particle dispersion (solid fraction: 20% by mass) was obtained as in Preparation Example 1 except that the copper phthalocyanine pigment was replaced by carbon black (FW100: tradename, available from Deggusa).

The volume standard average particle diameter (D50%) of the obtained polymer fine particles was 110 nm when observed by means of a particle diameter distribution measuring instrument (Microtrac UPA: tradename, available from Nikkiso Co., Ltd.).

Example 1

Sample Preparation of Cyan Ink 1

An ink composition according to the specification shown below was prepared. Subsequently, Cyan Ink 1 was prepared by filtering the composition through a membrane filter of an average pore size of 0.8 μm.

<Ink Composition>
cyan dispersion of Preparation Example 1 (solid fraction: 20.0% by mass) . . . 30.0% by mass
surfactant A (compound of General Formula (1) (X=2, Y=2, X+Y=4, Rf=$CF_2CF_3$) . . . 0.2% by mass
surfactant B (compound of General Formula (2a) ($R^3$ is a hexyl group having 6 carbon atoms and $R^4$ is a hexyl group having 6 carbon atoms, the total number of carbon atoms of $R^3$ and $R^4$=11 to 13, r=5, s=3.5) . . . 0.8% by mass
glycerin . . . 10.0% by mass
D-sorbitol . . . 10.0% by mass
acrylic acid emulsion (JONCRYL PDX-6102B: tradename, available from BASF Japan) . . . 2.0% by mass
2,2,4-trimethyl-1,3-pentanediol . . . 2.0% by mass
lithium hydroxide . . . 0.1% by mass
anti-septic agent (PROXEL LV: tradename, available from Abecia) . . . 0.1% by mass
ion exchange water . . . balance
total . . . 100.0% by mass Example 2

Sample Preparation of Black Ink 1

An ink composition according to the specification shown below was prepared. Subsequently, Black Ink 1 was prepared by filtering the composition through a membrane filter of an average pore size of 0.8 μm.

<Ink Composition>
black dispersion of Preparation Example 4 (solid fraction: 20% by mass) . . . 50.0% by mass
surfactant A (compound of General Formula (1) (X=2, Y=2, X+Y=4, Rf=$CF_2CF_3$) . . . 0.83% by mass
surfactant B (compound of General Formula (2a) ($R^3$ is a decanyl group having 10 carbon atoms and $R^4$ is an ethyl group having 2 carbon atoms, the total number of carbon atoms of $R^3$ and $R^4$=11 to 13, r=5, s=3.5) . . . 0.17% by mass
urea . . . 27.0% by mass
styrene-acrylic resin emulsion (JONCRYL 7100: tradename, available from BASF Japan) . . . 2.0% by mass
2-amino-2-ethyl-1,3-propanediol . . . 0.2% by mass
anti-septic agent (PROXEL LV: tradename, available for Avecia) . . . 0.1% by mass
ion exchange water . . . balance
total . . . 100.0% by mass Example 3

Sample Preparation of Cyan Ink 2

An ink composition according to the specification shown below was prepared. Subsequently, Cyan Ink 2 was prepared by filtering the composition through a membrane filter of an average pore size of 0.8 μm.

<Ink Composition>
cyan dispersion of Preparation Example 1 (solid fraction: 20.0% by mass) . . . 30.0% by mass
surfactant A (compound of General Formula (1) (X=2, Y=2, X+Y=4, Rf=$CF_2CF_3$) . . . 0.3% by mass surfactant B (compound of General Formula (2b) ($R^3$ is a butyl group having 4 carbon atoms and $R^4$ is a hydrogen atom, t=2, u=7) . . . 1.2% by mass
glycerin . . . 5.0% by mass
propylene glycol . . . 15.0% by mass
acrylic silicone resin emulsion (AP4710: tradename, available from SHOWA HIGHPOLYMER Co., Ltd.) . . . 3.0% by mass
triethanol amine . . . 0.2% by mass
anti-septic agent (PROXEL LV: tradename, available from Avecia) . . . 0.1% by mass
ion exchange water . . . balance
total . . . 100.0% by mass Example 4

Sample Preparation of Magenta Ink 1

An ink composition according to the specification shown below was prepared. Subsequently, Magenta Ink 1 was prepared by filtering the composition through a membrane filter of an average pore size of 0.8 μl.
<Ink Composition>
magenta dispersion of Preparation Example 2 (solid fraction: 20% by mass) . . . 50.0% by mass
surfactant A (compound of General Formula (1) (X=2, Y=2, X+Y=4, Rf=$CF_2CF_3$) . . . 0.75% by mass
surfactant B (compound of General Formula (2a) ($R^3$ is a hexyl group having 6 carbon atoms and $R^4$ is a hexyl group having 6 carbon atoms, the total number of carbon atoms of $R^3$ and $R^4$=11 to 13, r=7, s=4.5) . . . 0.25% by mass
glycerin . . . 7.0% by mass
3-methyl-2,4-hexanediol . . . 2.0% by mass
urethane resin emulsion (SUPERFLEX 110: tradename, available from DAI-ICHI KOGYO SEIYAKU Co., Ltd.) . . . 5.0% by mass
lithium hydroxide . . . 0.2% by mass
anti-septic agent (PROXEL LV: tradename, available from Avecia) . . . 0.1% by mass
ion exchange water . . . balance
total . . . 100.0% by mass Example 5

Sample Preparation of Yellow Ink 1

An ink composition according to the specification shown below was prepared. Subsequently, Yellow Ink 1 was prepared by filtering the composition through a membrane filter of an average pore size of 0.8 p.m.
<Ink Composition>
yellow dispersion of Preparation Example 3 (solid fraction: 20% by mass) . . . 30.0% by mass
surfactant A (compound of General Formula (1) (X=2, Y=2, X+Y=4, Rf=$CF_2CF_3$) . . . 0.4% by mass
surfactant B (compound of General Formula (2a) ($R^3$ is a decanyl group having 10 carbon atoms and $R^4$ is an ethyl group having 2 carbon atoms, the total number of carbon atoms of $R^3$ and $R^4$=11 to 13, r=7, s=2.5) . . . 1.1% by mass
glycerin . . . 10.0% by mass
tetramethylol propane . . . 30.0% by mass
urethane resin emulsion (W5661: tradename, available from Mitsui Takeda Chemicals Inc.) . . . 2.5% by mass
styrene-acryl resin emulsion (JONCRYL 7100: tradename, available from BASF Japan) . . . 8.0% by mass
2-amino-2-ethyl-1,3-propanediol . . . 0.2% by mass
ion exchange water . . . balance
total . . . 100.0% by mass Example 6

Sample Preparation of Black Ink 2

An ink composition according to the specification shown below was prepared. Subsequently, Black Ink 2 was prepared by filtering the composition through a membrane filter of an average pore size of 0.8 μm.
<Ink Composition>
black dispersion of Preparation Example 4 (solid fraction: 20% by mass) . . . 30.0% by mass
surfactant A (compound of General Formula (1) (X=2, Y=2, X+Y=4, Rf=$CF_2CF_3$) . . . 0.4% by mass
surfactant B (compound of General Formula (2b) ($R^3$ is a butyl group having 4 carbon atoms and $R^4$ is a hydrogen atom, t=2, u=10) . . . 0.15% by mass
glycerin . . . 14.0% by mass
urethane resin emulsion (SUPERFLEX: tradename, available from DAI-ICHI KOGYO SEIYAKU Co., Ltd.) . . . 5.0% by mass
2-ethyl-1,3-hexanediol . . . 2.0% by mass
triethanol amine . . . 0.2% by mass
anti-septic agent (PROXEL LV: tradename, available from Avecia) . . . 0.1% by mass
ion exchange water . . . balance
total . . . 100.0% by mass Example 7

Sample Preparation of Magenta Ink 2

An ink composition according to the specification shown below was prepared. Subsequently, Magenta Ink 2 was prepared by filtering the composition through a membrane filter of an average pore size of 0.8
<Ink Composition>
magenta dispersion of Preparation Example 2 (solid fraction: 20% by mass) . . . 50.0% by mass
surfactant A (compound of General Formula (1) (X=2, Y=2, X+Y=4, Rf=$CF_2CF_3$) . . . 0.2% by mass
surfactant B (compound of General Formula (2a) ($R^3$ is a decanyl group having 10 carbon atoms and $R^4$ is an ethyl group, the total number of carbon atoms of $R^3$ and $R^4$=11 to 13, r=5, s=3.5) . . . 0.8% by mass
glycerin . . . 15.0% by mass
3-methyl-1,3-pentanediol . . . 15.0% by mass
2,2,2-trimethyl-1,3-pentanediol . . . 2.0% by mass
urethane resin emulsion (W6061: tradename, available from Mitsui Takeda Chemicals Inc.) . . . 1.0% by mass
fluorine resin emulsion (LUMIFLON FE4500: tradename, available from ASAHI GLASS CO., LTD).) . . . 1.0% by mass
2-amino-2-ethyel-1,3-propanediol . . . 0.2% by mass
ion exchange water . . . balance
total . . . 100.0% by mass Example 8

Sample Preparation of Yellow Ink 2

An ink composition according to the specification shown below was prepared. Subsequently, Yellow Ink 2 was prepared by filtering the composition through a membrane filter of an average pore size of 0.8 μm.

<Ink Composition>
yellow dispersion of Preparation Example 3 (solid fraction: 20% by mass) . . . 30.0% by mass
surfactant A (compound of General Formula (1) (X=2, Y=2, X+Y=4, Rf=$CF_2CF_3$) . . . 0.25% by mass
surfactant B (compound of General Formula (2a) ($R^3$ is a hexyl group having 6 carbon atoms and $R^4$ is a hexyl group having 6 carbon atoms, the total number of carbon atoms of $R^3$ and $R^4$=11 to 13, r=5, s=3.5) . . . 0.25% by mass
glycerin . . . 10.0% by mass
1,6-hexanediol . . . 15.0% by mass
acrylic silicone resin emulsion (AP4710: tradename, available from SHOWA HIGHPOLYMER Co., Ltd.) . . . 2.0% by mass
2,2,2-trimethyl-1,3-pentadiol . . . 2.0% by mass
anti-septic agent (PROXEL LV: tradename, available from Avecia) . . . 0.1% by mass
ion exchange water . . . balance
total . . . 100.0% by mass Comparative Example 1

Sample Preparation of Comparative Cyan Ink 1

Comparative Cyan Ink 1 was prepared in the same manner as in Example 1 except that the surfactant A was replaced by a fluorine-based surfactant (FUTARGENT 110: tradename, available from Neos Co., Ltd.).

The fluorine-based surfactant (FUTARGENT 110: tradename, available from Neos Co., Ltd.) has a structure represented by the following General Formula:

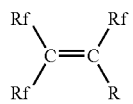

where Rf represents a perfluoroalkyl group and R represents an alkyl group.

Comparative Example 2

Sample Preparation of Comparative Cyan Ink 2

Comparative Cyan Ink 2 was prepared in the same manner as in Example 3 except that the surfactant A was not added but ion exchange water was increased to compensate the surfactant A.

Comparative Example 3

Sample Preparation of Comparative Cyan Ink 3

Comparative Cyan Ink 3 was prepared in the same manner as in Example 3 except that the surfactant B was replaced by a polyoxyethylene alkylene derivative (TOC: tradename, available from NOF CORPORATION)

Comparative Example 4

Sample Preparation of Comparative Magenta Ink 1

Comparative Magenta Ink 1 was prepared in the same manner as in Example 4 except that the surfactant B was not added but the % by mass of ion exchange water was increased to compensate the surfactant B.

Comparative Example 5

Sample Preparation of Comparative Yellow Ink 1

Comparative Yellow Ink 1 was prepared in the same manner as in Example 5 except that the surfactant A was replaced by a fluorine-based surfactant represented by the following General Formula (A) and the surfactant B was not added but the % by mass of ion exchange water was increased to compensate the surfactant B.

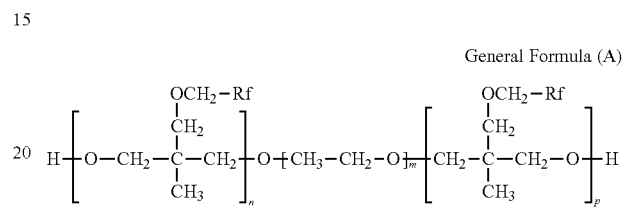

General Formula (A)

In General Formula (A), Rf represents $CF_3$ or $CF_2CF_3$ and n, m and p are real numbers of n=1 to 4, m=6 to 25 and n=1 to 4.

[Preparation of Nozzle Plate a of Printer Head]

A $SiO_2$ layer with about 1 nm (10 angstroms)-thickness was formed on a polyimide film (Kapton: tradename available from DuPont, without particles added thereto) by sputtering and subsequently a ink-repellent layer with about 5 nm (50 angstroms)-thickness of modified perfluoropolyoxetane (OPTOOL DSX: tradename, available from Daikin Industriesm Ltd.) was formed thereon by vacuum evaporation. Then, nozzle holes were bored from the polyimide film side by an excimer laser to produce nozzle plate a.

[Preparation of Nozzle Plate b of Printer Head]

Silicone resin (SR2411: tradename, available from Dow Corning Toray Co., Ltd.) was applied onto the surfaces of Ni elecroformed nozzles by means of a dispenser to form a 1.2 μm-thick silicone film layer.

At this time, the nozzle holes and the rear surface of the nozzle plate were masked with water-soluble resin, which was peeled off after the formation of the silicone layer by application. Subsequently, the applied silicone resin was left at room temperature for 2 days and allowed to set so as to form an ink-repellent layer and produce nozzle plate b.

<Evaluation>

The prepared nozzle plates a and b were set in respective printers (IPSIO G707: tradename, available from RICOH Co., Ltd.). Then, each of the inkjet recording inks prepared in Examples and Comparative Examples was set in an ink cartridge and evaluated for saturation, ejection stability, adhesion to nozzle surface and bleeding in a manner as described below. The evaluation results are shown in Tables 1 and 2.

Evaluation 1

Evaluation of Coloring Property: Saturation

A pattern was printed with color ink of each of yellow, magenta and cyan at 100% duty cycle on paper (My Paper: tradename, available from RICOH Co., Ltd.) by means of a printer (IPSiO G707: tradename, available from RICOH Co., Ltd.) under printing conditions of about 142 dot/cm (360 dpi) and one-pass printing.

After drying the printed pattern, the monochrome solid image section of each of yellow, magenta and cyan was observed by means of a reflective color spectrodensitometer (available from X-Rite, Inc.) to determine the coordinates of the L*a*b* color system according to the CIE Color Specification and saturation C* of each of the colors. An ink showing a high value for saturation C* is an ink having a good coloring property.

Saturation C* is defined by the following formula.

$$C^* = [(a^*)^2 + (b^*)^2]^{1/2} \quad \text{Calculation Formula (1)}$$

Evaluation 2

Ejection Stability

A pattern was printed on paper (My Paper: tradename, available from RICOH Co., Ltd.) by means of a printer (IPSiO G707: tradename, available from RICOH Co., Ltd.) with each of inks of yellow, magenta, cyan and black at 100% duty cycle. The pattern was a chart where the area of each of the colors was 5% relative to the entire area of the printed sheet of paper.

The printing conditions included a recording density of about 142 dot/cm (360 dpi) and one-pass printing.

Evaluation 2 was made after making evaluation 1 for each of the inks of Examples and Comparative Examples. For intermittent imaging, the above chart was printed for imaging consecutively on 20 sheets of paper and then a sheet feed state where no ink was ejected was held for 20 minutes. The above cycle was repeated for 50 times to print a total of 1,000 sheets. Thereafter, the same chart was printed for imaging and the solid areas of the 5% chart was visually observed for stripes, white spots and disturbed ink ejections and evaluated by using the rating criteria shown below.

[Rating Criteria]
A: No stripes, no white spots and no disturbed ink ejections were observed in solid areas.
B: Stripes, white spots and disturbed ink ejections were slightly observed in solid areas.
C: Stripes, white spots and disturbed ink ejections were observed after the first scan.
D: Stripes, white spots and disturbed ink ejections were observed in all solid areas.

Evaluation 3

Ink Adhesion to Nozzle Surface

A printer (IPSIO G707: tradename, available from RICOH Co., Ltd.) was put in a thermo-hygrostat chamber and the intra-chamber environment was held to a temperature of 32° C. and a relative humidity of 30% RH. A printing pattern chart as described below was printed for imaging consecutively on 20 sheets of paper and then a sheet feed state where no ink was ejected was held for 20 minutes. The above cycle was repeated for 50 times to print a total of 1,000 sheets. Thereafter, the nozzle plate was observed under a microscope to determine the presence or absence of ink adhesion to the nozzle surface. Although the rating criteria are shown below, only the rank A is acceptable.

—Printing Pattern Chart and Printing Conditions—

The printing pattern chart was such that the area of each of the colors was 5% relative to the entire area of the printed sheet of paper and a pattern was printed with each of inks at 100% duty cycle. The printing conditions included a recording density of about 118 dot/cm (300 dpi) and one-pass printing.

—Rating Criteria for Evaluation of Ink Adhesion to Nozzle Surface—
A: No ink adhesion was observed on the nozzle surface.
B: Ink adhesion was observed on a part of the nozzle surface.
C: Ink adhesion was observed on the entirety of the nozzle surface.

Evaluation 4

Bleeding

A printer (IPSIO G707: tradename, available from RICOH Co., Ltd.) was used to perform printing on MY PAPER (available from RICOH Co., Ltd.). The printing pattern was such that yellow ink was printed at 100% duty cycle. Then, letters of black ink were printed on the obtained yellow solid image, to thereby visually evaluate bleeding between the yellow ink and the black ink according to the following rating criteria. The printing conditions included a recording density of about 142 dot/cm (360 dpi) and one-pass printing.

—Rating Criteria for Evaluation of Bleeding—
A: No bleeding occurred and black letters were clearly recognizable.
B: Slight bleeding occurred and black letters somewhat bled.
C: Bleeding occurred and black letters were hardly recognizable.

TABLE 1

|  | Nozzle plate a | | | Nozzle plate b | | |
| --- | --- | --- | --- | --- | --- | --- |
|  | Saturation | Ejection stability | Ink adhesion test | Saturation | Ejection stability | Ink adhesion test |
| Example 1 | 51.98 | A | A | 51.88 | A | A |
| Example 2 | — | A | A | — | A | A |
| Example 3 | 52.06 | A | A | 52.11 | A | A |
| Example 4 | 62.53 | A | A | 62.54 | A | A |
| Example 5 | 82.02 | A | A | 82.13 | A | A |
| Example 6 | — | A | A | — | A | A |
| Example 7 | 62.26 | A | A | 62.24 | A | A |
| Example 8 | 82.46 | A | A | 82.50 | A | A |
| Comp. Ex. 1 | 48.57 | B | C | 48.67 | B | C |
| Comp. Ex. 2 | 48.57 | B | C | 48.48 | B | C |
| Comp. Ex. 3 | 50.23 | A | B | 50.32 | A | C |
| Comp. Ex. 4 | 61.42 | A | B | 61.32 | A | C |
| Comp. Ex. 5 | 80.09 | A | B | 80.12 | A | B |

TABLE 2

|  | Bleeding |
| --- | --- |
| Example 1 | A |
| Example 2 | A |
| Example 3 | A |
| Example 4 | A |
| Example 5 | A |
| Example 6 | A |
| Example 7 | A |
| Example 8 | A |
| Comparative Example 1 | C |
| Comparative Example 2 | C |
| Comparative Example 3 | B |

TABLE 2-continued

| | Bleeding |
|---|---|
| Comparative Example 4 | C |
| Comparative Example 5 | A |

The facts as listed below are found from the results shown above. Evaluation of saturation: The saturation rose by adding surfactants A and B in Examples 1 to 8.
Evaluation of ejection stability: Ejection stability was secured in Examples 1 to 8 because bubbles were hardly produced as bubbling was suppressed there due to the effect of suppressing bubbling of surfactant A.
Ink adhesion test: Adding surfactants A and B provided a preventive effect on ink adhesion to the printing head.
The embodiments the present invention are as follows.
<1> An inkjet recording ink including:
a colorant;
surfactant A;
surfactant B;
a water-soluble organic solvent; and
water,
wherein the surfactant A is represented by the following General Formula (1), and the surfactant B is at least one selected from the group consisting of a compound represented by the following General Formula (2a) and a compound represented by the following General Formula (2b):

$$\text{HO}-\left[\begin{array}{c}\text{OCH}_2\text{CH}_2-\text{Rf}\\|\\\text{CH}_2\\|\\\text{CH}_2\text{CCH}_2\text{O}\\|\\\text{CH}_3\end{array}\right]_X-\left[\begin{array}{c}\text{CH}_3\\|\\\text{CH}_2\text{CCH}_2\\|\\\text{CH}_3\end{array}\right]-\left[\begin{array}{c}\text{OCH}_2\text{CH}_2-\text{Rf}\\|\\\text{CH}_2\\|\\\text{CH}_2\text{CCH}_2\text{O}\\|\\\text{CH}_3\end{array}\right]_Y-\text{OH} \quad \text{General Formula (1)}$$

in General Formula (1), Rf represents $CF_3$, $CF_2CF_3$, $(CF_2)_3F$ or $(CF_2)_4F$, X and Y each are an integer of 1 or greater, and X+Y=4 or 5;

$$R^3-\underset{\underset{R^4}{|}}{\text{CH}}-\text{O}-[\text{CH}_2-\text{CH}_2\text{O}]_r-[\text{CH}_2\text{CHO}]_s-\text{H} \quad \text{General Formula (2a)}$$
$$\qquad \qquad \qquad \qquad \qquad \qquad \underset{\text{CH}_3}{|}$$

in General Formula (2a), each of $R^3$ and $R^4$ represents a hydrogen atom or an alkyl group having 1 to 20 carbon atoms, r is a real number of 0 to 7, and s is a real number of 1 to 10, $$R^3-\underset{\underset{R^4}{|}}{\text{CH}}-\text{O}-[\text{CH}_2-\underset{\underset{\text{CH}_3}{|}}{\text{CH O}}]_t-[\text{CH}_2\text{CHO}]_u-\text{H} \quad \text{General Formula (2b)}$$
$$\qquad \qquad \qquad \qquad \qquad \qquad \underset{\text{CH}_3}{|}$$

in General Formula (2b), each of $R^3$ and $R^4$ represents a hydrogen atom or an alkyl group having 1 to 20 carbon atoms, t is a real number of 0 to 7, and u is a real number of 1 to 10.
<2> The inkjet recording ink according to <1>, wherein the colorant is obtained by dispersing an organic pigment or carbon black with a nonionic dispersing agent represented by the following General Formula (4):

$$\underset{(R^2)_L}{\bigcirc\bigcirc}-\text{O}(\text{CH}_2\text{CH}_2\text{O})_k-\text{H} \quad \text{General Formula (4)}$$

in General Formula (4), $R^2$ is an alkyl group having 1 to 20 carbon atoms, an aralkyl group having 1 to 20 carbon atoms or an allyl group, L is an integer of 0 to 7, and k is an integer of 20 to 80.
<3> The inkjet recording ink according to <1> or <2>, wherein the colorant is a self dispersing type pigment obtained by causing a hydrophilic group to react with a surface of an organic pigment or carbon black.
<4> The inkjet recording ink according to any one of <1> to <3>, further including a resin emulsion.
<5> An ink cartridge including: the inkjet recording ink according to any one of <1> to <4>.
<6> An inkjet recording method including:
ejecting the inkjet recording ink according to any one of <1> to <4> with an inkjet recording apparatus which includes an inkjet head containing an ink-repellent layer containing a fluorine-based silane coupling agent or an ink-repellent layer containing a silicone resin.
<7> An ink-recorded matter including:
a recording medium; and
an image recorded on the recording medium with the inkjet recording ink according to any one of <1> to <4>.
This application claims priority to Japanese application No. 2011-056937, filed on Mar. 15, 2011, and incorporated herein by reference.

What is claimed is:
1. An inkjet recording ink comprising:
a colorant;
surfactant A;
surfactant B;
a water-soluble organic solvent; and
water,
wherein the surfactant A is represented by the following General Formula (1), and the surfactant B is at least one selected from the group consisting of a compound represented by the following General Formula (2a) and a compound represented by the following General Formula (2b):

$$\text{HO}-\left[\begin{array}{c}\text{OCH}_2\text{CH}_2-\text{Rf}\\|\\\text{CH}_2\\|\\\text{CH}_2\text{CCH}_2\text{O}\\|\\\text{CH}_3\end{array}\right]_X-\left[\begin{array}{c}\text{CH}_3\\|\\\text{CH}_2\text{CCH}_2\\|\\\text{CH}_3\end{array}\right]-\left[\begin{array}{c}\text{OCH}_2\text{CH}_2-\text{Rf}\\|\\\text{CH}_2\\|\\\text{CH}_2\text{CCH}_2\text{O}\\|\\\text{CH}_3\end{array}\right]_Y-\text{OH} \quad \text{General Formula (1)}$$

in General Formula (1), Rf represents $CF_3$, $CF_2CF_3$, $(CF_2)_3F$ or $(CF_2)_4F$, X and Y each are an integer of 1 or greater, and X+Y=4 or 5;

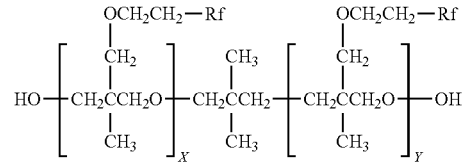
General Formula (1)

in General Formula (1), Rf represents $CF_3$, $CF_2CF_3$, $(CF_2)_3F$ or $(CF_2)_4F$, X and Y each are an integer of 1 or greater, and X+Y=4 or 5;

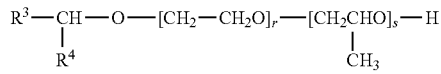
General Formula (2a)

in General Formula (2a), each of $R^3$ and $R^4$ represents a hydrogen atom or an alkyl group having 1 to 20 carbon atoms, r is a real number of 0 to 7, and s is a real number of 1 to 10,

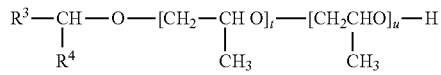
General Formula (2b)

in General Formula (2b), each of $R^3$ and $R^4$ represents a hydrogen atom or an alkyl group having 1 to 20 carbon atoms, t is a real number of 0 to 7, and u is a real number of 1 to 10.

2. The inkjet recording ink according to claim 1, wherein the colorant is obtained by dispersing an organic pigment or carbon black with a nonionic dispersing agent represented by the following General Formula (4):

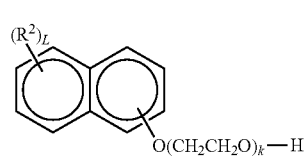
General Formula (4)

in General Formula (4), $R^2$ is an alkyl group having 1 to 20 carbon atoms, an aralkyl group having 1 to 20 carbon atoms or an allyl group, L is an integer of 0 to 7, and k is an integer of 20 to 80.

3. The inkjet recording ink according to claim 1, wherein the colorant is a self dispersing type pigment obtained by causing a hydrophilic group to react with a surface of an organic pigment or carbon black.

4. The inkjet recording ink according to claim 1, further comprising a resin emulsion.

5. The inkjet recording ink according to claim 1, wherein formula (1) X=2 and Y=2.

6. The inkjet recording ink of claim 5, wherein formula (1) $R^f$ is $CF_2CF_3$.

7. The inkjet recording ink according to claim 1, wherein surfactant B is represented by formula (2a).

8. The inkjet recording ink according to claim 7, wherein formula (2a) $R^3$ is a hexyl group, $R^4$ is a hexyl group, $R^3$=11-13, $R^4$=11-13, r=5 and s=3.5.

9. An ink cartridge comprising:
an inkjet recording ink which comprises:
a colorant;
surfactant A;
surfactant B;
a water-soluble organic solvent; and
water,
wherein the surfactant A is represented by the following General Formula (1), and the surfactant B is at least one selected from the group consisting of a compound represented by the following General Formula (2a) and a compound represented by the following General Formula (2b):

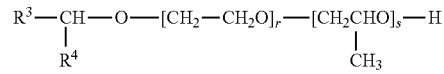
General Formula (2a)

in General Formula (2a), each of $R^3$ and $R^4$ represents a hydrogen atom or an alkyl group having 1 to 20 carbon atoms, r is a real number of 0 to 7, and s is a real number of 1 to 10,

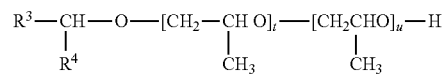
General Formula (2b)

in General Formula (2b), each of $R^3$ and $R^4$ represents a hydrogen atom or an alkyl group having 1 to 20 carbon atoms, t is a real number of 0 to 7, and u is a real number of 1 to 10.

10. The ink cartridge according to claim 9, wherein formula (1) X=2 and Y=2.

11. The ink cartridge according to claim 9, wherein formula (1) $R^f$ is $CF_2CF_3$.

12. The ink cartridge according to claim 9, wherein the surfactant B is of formula (2a).

13. The ink cartridge according to claim 12, wherein formula (2a) $R^3$ is a hexyl group, $R^4$ is a hexyl group, $R^3$=11-13, $R^4$=11-13, r=5 and s=3.5.

14. An inkjet recording method comprising:
ejecting an inkjet recording ink with an inkjet recording apparatus which includes an inkjet head containing an ink-repellent layer containing a fluorine-based silane coupling agent or an ink-repellent layer containing a silicone resin,
wherein the inkjet recording ink comprises:
a colorant;
surfactant A;
surfactant B;
a water-soluble organic solvent; and
water,
wherein the surfactant A is represented by the following General Formula (1), and the surfactant B is at least one selected from the group consisting of a compound represented by the following General Formula (2a) and a compound represented by the following General Formula (2b):

General Formula (1)

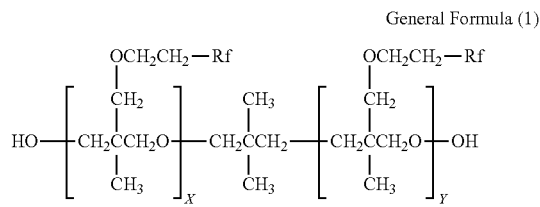

in General Formula (1), Rf represents $CF_3$, $CF_2CF_3$, $(CF_2)_3F$ or $(CF_2)_4F$, X and Y each are an integer of 1 or greater, and X+Y=4 or 5;

General Formula (2a)

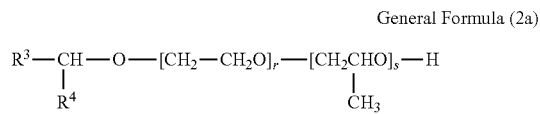

in General Formula (2a), each of $R^3$ and $R^4$ represents a hydrogen atom or an alkyl group having 1 to 20 carbon atoms, r is a real number of 0 to 7, and s is a real number of 1 to 10, General Formula (2b)

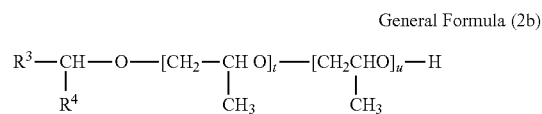

in General Formula (2b), each of $R^3$ and $R^4$ represents a hydrogen atom or an alkyl group having 1 to 20 carbon atoms, t is a real number of 0 to 7, and u is a real number of 1 to 10.

15. The inkjet recording method according to claim 14, wherein formula (1) X=2; and Y=2.

16. The inkjet recording method according to claim 15, wherein formula (1) $R^f$ is $CF_2CF_3$.

17. The inkjet recording method according to claim 14, wherein the surfactant B is of formula (2a).

18. The inkjet recording method of claim 17, wherein formula (2a) $R^3$ is a hexyl group, $R^4$ is a hexyl group, $R^3$=11-13, $R^4$=11-13, r=5 and s=3.5.

* * * * *